US012686439B2

(12) United States Patent
Matsumoto et al.

(10) Patent No.: US 12,686,439 B2
(45) Date of Patent: Jul. 21, 2026

(54) UPPER SUPPORT AND METHOD OF MANUFACTURING UPPER SUPPORT

(71) Applicants: SUMITOMO RIKO COMPANY LIMITED, Komaki (JP); TOYOTA JIDOSHA KABUSHIKI KAISHA, Toyota (JP)

(72) Inventors: Yuki Matsumoto, Komaki (JP); Yuta Kamada, Komaki (JP); Tsutomu Iwai, Toyota (JP)

(73) Assignees: SUMITOMO RIKO COMPANY LIMITED, Komaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 365 days.

(21) Appl. No.: 18/441,232

(22) Filed: Feb. 14, 2024

(65) Prior Publication Data

US 2024/0317314 A1 Sep. 26, 2024

(30) Foreign Application Priority Data

Mar. 23, 2023 (JP) ................................. 2023-046286

(51) Int. Cl.
B62D 21/11 (2006.01)
(52) U.S. Cl.
CPC .................................... B62D 21/11 (2013.01)
(58) Field of Classification Search
CPC ....... F16F 9/54; B60G 13/003; B60G 15/068; B60G 2204/128
USPC .... 280/124.144, 124.145, 124.146, 124.147, 280/124.151, 124.154, 124.155
See application file for complete search history.

(56) References Cited

U.S. PATENT DOCUMENTS

| | | | | |
|---|---|---|---|---|
| 5,678,808 A | * | 10/1997 | Claude ................... | F16F 9/064 267/221 |
| 6,126,155 A | * | 10/2000 | Smith .................. | B60G 15/067 267/293 |
| 6,736,381 B2 | * | 5/2004 | Chesne ................ | B60G 15/068 280/124.155 |
| 8,226,301 B2 | * | 7/2012 | Poulle ................... | B60G 11/15 280/124.145 |
| 8,474,846 B2 | * | 7/2013 | Dubus ................... | F16C 33/761 280/124.147 |
| 8,496,235 B2 | * | 7/2013 | Viault ..................... | F16C 19/10 384/607 |
| 9,340,086 B2 | * | 5/2016 | Corbett ................ | B60G 15/067 |
| 9,662,953 B2 | * | 5/2017 | Murakami ........... | B60G 15/062 |

(Continued)

*Primary Examiner* — Toan C To
(74) *Attorney, Agent, or Firm* — Oliff PLC

(57) ABSTRACT

An upper support including a bracket to be attached to a vehicle body side, and a support main body attached to a center portion of the bracket to receive a suspension component. The bracket includes upper and lower metal brackets having respective flanged parts overlapped with each other, and their overlapped surfaces are welded and fixed at multiple locations in a circumferential direction. Fixing bolts for attaching the bracket to the vehicle body side are provided to an overlapped portion of the flanged parts and are spaced apart from one another in the circumferential direction. An adhesive is applied to an outer peripheral edge of the overlapped portion of the flanged parts, and the adhesive provides sealing at an outer peripheral end between the overlapped surfaces of the flanged parts in outer peripheral regions of the corresponding fixing bolts.

6 Claims, 6 Drawing Sheets

(56)                    References Cited

U.S. PATENT DOCUMENTS

| | | | | |
|---|---|---|---|---|
| 10,166,829 | B2 * | 1/2019 | Hubert | F16C 33/761 |
| 11,801,723 | B2 * | 10/2023 | Watanabe | F16F 9/54 |
| 12,011,961 | B2 * | 6/2024 | Jeong | B60G 15/067 |
| 12,565,070 | B2 * | 3/2026 | Otsu | B60G 15/065 |
| 2001/0026057 | A1 | 10/2001 | Hayashi et al. | |
| 2020/0164708 | A1 * | 5/2020 | Lim | B60G 15/068 |
| 2020/0406515 | A1 * | 12/2020 | Lim | B29C 45/14008 |
| 2023/0128517 | A1 * | 4/2023 | Shibata | F16C 35/06 |
| | | | | 280/124.155 |

* cited by examiner

UPPER SUPPORT AND METHOD OF MANUFACTURING UPPER SUPPORT

INCORPORATED BY REFERENCE

The disclosure of Japanese Patent Application No. 2023-046286 filed on Mar. 23, 2023 including the specification, drawings and abstract is incorporated herein by reference in its entirety.

BACKGROUND ART

1. Technical Field

The present disclosure relates to an upper support for a suspension and a method for manufacturing an upper support. The upper support connects a piston rod of a shock absorber, which constitutes a suspension of a vehicle, to a vehicle body in a vibration damping manner.

2. Description of the Related Art

The basic structure of an upper support is known, for example, as described in U.S. Publication No. US 2001/0026057 A1. Such an upper support is configured to be overlapped with a vehicle body member on the vehicle side at the flanged part, and fixed by being tightened with fixing bolts at a plurality of locations in the circumferential direction to be mounted thereto.

Meanwhile, the upper support may be exposed to water splashed by the wheels while the vehicle is in a travel state, and may be exposed to more water on flooded roads or the like.

SUMMARY

In particular, the portion of the upper support to be attached to the vehicle side has a structure in which upper and lower flanged parts are overlapped, and is configured to be fixed to the vehicle side by being tightened with fixing bolts at a plurality of locations in the circumferential direction. Therefore, there is a possibility of gaps occurring between the overlapped surfaces of the upper and lower flanged parts due to distortion of the upper and lower flanged parts or the like caused by the tightening force of the fixing bolts, for example. In addition, the upper and lower flanged parts may have concave and convex portions for structural reasons or for reinforcing the rigidity of the attachment surface to the vehicle body side. Here, there is also circumstances where gaps are likely to appear between the concave and convex portions of the upper and lower flanged parts due to reasons of metal process or the like. The penetration of water through such inevitable gaps still needs to be discussed, and in combination with the fact that the penetrating water is likely to pool inside the upper support, there was room for further improvement in the upper and lower metal brackets that constitute the upper support, assuming even the special usage conditions of the vehicle.

It is therefore one object of the present disclosure to provide a novel upper support and a novel method for manufacturing an upper support which are able to prevent water from penetrating into the interior of the upper support through the gap between the overlapped surfaces of the flanged parts of the upper and lower metal brackets.

The present disclosure provides an upper support comprising: a bracket configured to be attached to a vehicle body side; and a support main body configured to receive a suspension component while being attached to a center portion of the bracket, wherein the bracket comprises an upper metal bracket and a lower metal bracket, the upper and lower metal brackets including respective flanged parts overlapped with each other, overlapped surfaces of the respective flanged parts of the upper and lower metal brackets are welded and fixed at a plurality of locations in a circumferential direction, a plurality of fixing bolts configured to attach the bracket to the vehicle body side are provided to an overlapped portion of the respective flanged parts of the upper and lower metal brackets, the fixing bolts being spaced apart from one another in the circumferential direction, and an adhesive is applied to an outer peripheral edge of the overlapped portion of the respective flanged parts of the upper and lower metal brackets, and the adhesive provides sealing at an outer peripheral end between the overlapped surfaces of the respective flanged parts of the upper and lower metal brackets in outer peripheral regions of the corresponding fixing bolts.

The present disclosure provides a method of manufacturing an upper support including a bracket configured to be attached to a vehicle body side, and a support main body configured to receive a suspension component while being attached to a center portion of the bracket, the method comprising: preparing the support main body; preparing an upper metal bracket and a lower metal bracket including respective flanged parts configured to be overlapped with each other to constitute the bracket; sandwiching the support main body between the upper metal bracket and the lower metal bracket from both upper and lower sides to attach the support main body into a tubular support housing formed in the center portion between the upper and lower metal brackets, and aligning the respective flanged parts of the upper and lower metal brackets with each other in an overlapped state; welding and fixing the respective flanged parts of the upper and lower metal brackets to each other at a plurality of locations in a circumferential direction, the upper and lower metal brackets having been aligned with each other in the overlapped state; performing a painting treatment on outer surfaces of the upper and lower metal brackets that have been welded and fixed to each other at the respective flanged parts; fastening fixing bolts for attachment to the vehicle body side by swaging to the respective flanged parts in the upper and lower metal brackets that have been aligned with each other in the overlapped state; and applying an adhesive to an outer peripheral edge of an overlapped portion of the respective flanged parts in the upper and lower metal brackets that have been aligned with each other in the overlapped state, and providing sealing at an outer peripheral end between overlapped surfaces of the respective flanged parts of the upper and lower metal brackets with the adhesive.

According to the present disclosure, it is possible to provide an upper support capable of preventing water from penetrating into the interior of the upper support through the gap between the overlapped surfaces of the flanged parts of the upper and lower metal brackets.

According to the method of the present disclosure, it is possible to efficiently manufacture an upper support that is able to exhibit the above-mentioned effect.

BRIEF DESCRIPTION OF THE DRAWINGS

The foregoing and/or other objects, features and advantages of the disclosure will become more apparent from the following description of practical embodiments with reference to the accompanying drawings in which like reference numerals designate like elements and wherein.

DETAILED DESCRIPTION

Figure 1:
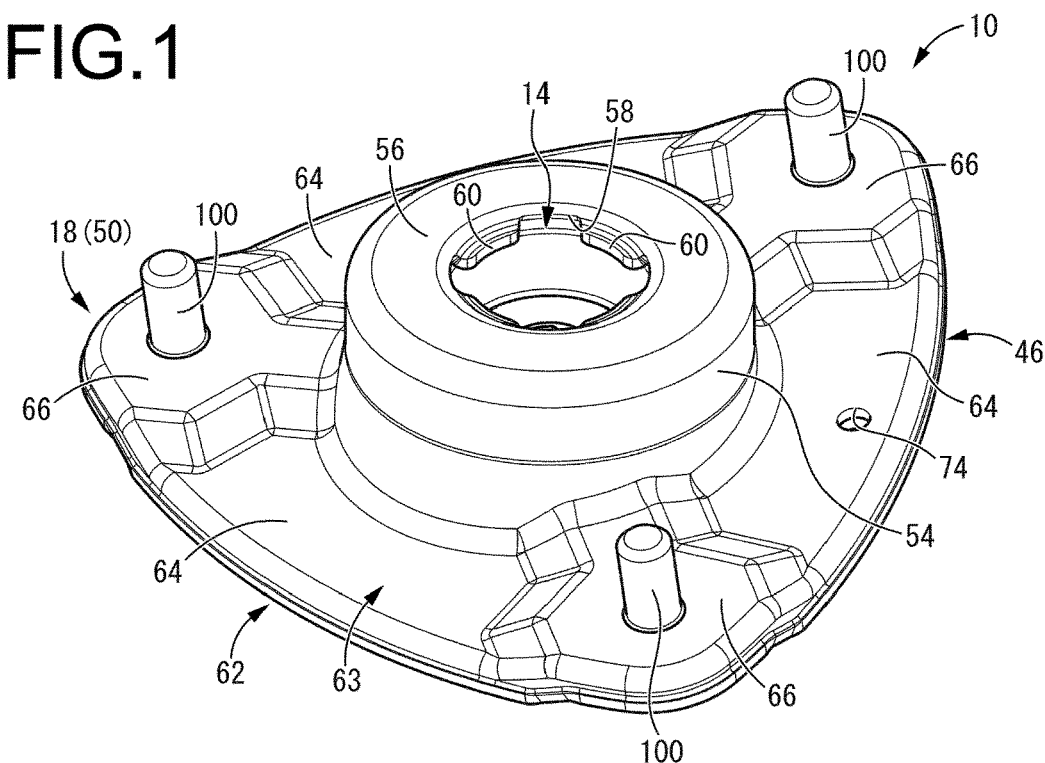
FIG. 1 is a perspective view showing an upper support according to Practical Embodiment 1 of the present disclosure.

Explanation of Practical Embodiments of the Present Disclosure

First, preferred embodiments of the present disclosure will be listed and described.

(1) The present disclosure provides an upper support comprising: a bracket configured to be attached to a vehicle body side; and a support main body configured to receive a suspension component while being attached to a center portion of the bracket, wherein the bracket comprises an upper metal bracket and a lower metal bracket, the upper and lower metal brackets including respective flanged parts overlapped with each other, overlapped surfaces of the respective flanged parts of the upper and lower metal brackets are welded and fixed at a plurality of locations in a circumferential direction, a plurality of fixing bolts configured to attach the bracket to the vehicle body side are provided to an overlapped portion of the respective flanged parts of the upper and lower metal brackets, the fixing bolts being spaced apart from one another in the circumferential direction, and an adhesive is applied to an outer peripheral edge of the overlapped portion of the respective flanged parts of the upper and lower metal brackets, and the adhesive provides sealing at an outer peripheral end between the overlapped surfaces of the respective flanged parts of the upper and lower metal brackets in outer peripheral regions of the corresponding fixing bolts.

According to the present preferred embodiment, an adhesive is applied at the outer peripheral edge of the overlapped portion of the respective flanged parts of the upper and lower metal brackets, and the opening to the radially outer side between the overlapped surfaces of the respective flanged parts of the upper and lower metal brackets (especially the outer peripheral regions of the corresponding fixing bolts as described above where the risk of a gap occurring is large) is sealed by the adhesive. This may prevent penetration of water into the upper support through the gap between the overlapped surfaces of the respective flanged parts of the upper and lower metal brackets.

(2) In the above-mentioned preferred embodiment (1), it is preferable that the adhesive is continuously applied over an entire circumference at the outer peripheral edge of the overlapped portion of the respective flanged parts of the upper and lower metal brackets, and the adhesive provides sealing at the outer peripheral end between the overlapped surfaces of the respective flanged parts of the upper and lower metal brackets over the entire circumference.

According to the present preferred embodiment, penetration of water between the flanged part of the upper metal bracket and the flanged part of the lower metal bracket can be more reliably prevented.

(3) In the above-mentioned preferred embodiment (1) or (2), it is preferable that the flanged part of the upper metal bracket includes lowered regions that are lowered and spread in a plurality of regions in the circumferential direction, and the overlapped surfaces of the respective flanged parts of the upper and lower metal brackets are welded and fixed to each other at the lowered regions.

According to the present preferred embodiment, the lowered regions, which are overlapped with the flanged part of the lower metal bracket and welded thereto, are provided so as to be lowered in the flanged part of the upper metal bracket. Thus, the lowered regions can be welded to the flanged part of the lower metal bracket with a smaller gap therebetween, thereby reliably preventing penetration of water through the gap between the two flanged parts.

(4) In the above-mentioned preferred embodiment (3), it is preferable that the flanged part of the upper metal bracket includes attachment regions that spread above the lowered regions in portions that are circumferentially off the lowered regions, and the fixing bolts are provided to the corresponding attachment regions.

According to the present preferred embodiment, a plurality of attachment regions are provided so as to be spaced away from one another in the circumferential direction. Thus, with the upper support mounted on the vehicle, it is possible to reduce the overlapped area of the upper support with the vehicle body, thereby avoiding striking of the upper support and the vehicle body due to vibration during driving, or reducing noise during striking.

(5) In any one of the above-mentioned preferred embodiments (1)-(4), it is preferable that the overlapped portion of the respective flanged parts of the upper and lower metal brackets is welded and fixed by projection welding.

According to the present preferred embodiment, heat and pressure from the electrode can be more intensively exerted on the projection for projection welding than, for example, spot welding. Thus, welding can be stably performed even when the upper and lower metal brackets are relatively thick-walled.

(6) The present disclosure provides a method of manufacturing an upper support including a bracket configured to be attached to a vehicle body side, and a support main body configured to receive a suspension component while being attached to a center portion of the bracket, the method comprising: preparing the support main body; preparing an upper metal bracket and a lower metal bracket including respective flanged parts configured to be overlapped with each other to constitute the bracket; sandwiching the support main body between the upper metal bracket and the lower metal bracket from both upper and lower sides to attach the support main body into a tubular support housing formed in the center portion between the upper and lower metal brackets, and aligning the respective flanged parts of the upper and lower metal brackets with each other in an overlapped state; welding and fixing the respective flanged parts of the upper and lower metal brackets to each other at a plurality of locations in a circumferential direction, the upper and lower metal brackets having been aligned with each other in the overlapped state; performing a painting treatment on outer surfaces of the upper and lower metal brackets that have been welded and fixed to each other at the respective flanged parts; fastening fixing bolts for attachment to the vehicle body side by swaging to the respective flanged parts in the upper and lower metal brackets that have been aligned with each other in the overlapped state; and applying an adhesive to an outer peripheral edge of an overlapped portion of the respective flanged parts in the upper and lower metal brackets that have been aligned with each other in the overlapped state, and providing sealing at an outer peripheral end between overlapped surfaces of the respective flanged parts of the upper and lower metal brackets with the adhesive.

According to the present preferred embodiment, it is possible to efficiently manufacture an upper support that can exhibit the effect described in the above-mentioned preferred embodiment (1). The order in which the steps described in the present preferred embodiment are carried out is not limited, but the said steps can be carried out in any appropriate order.

Details of Practical Embodiments of the Present Disclosure

Specific examples of the upper support of the present disclosure will be described below with reference to the drawings. The present disclosure is not limited to these examples, but is indicated by the scope of the claims, and all changes that come within the meaning and range of equivalency of the claims are intended to be embraced therein.

Practical Embodiment 1

Hereinafter, an upper support 10 according to Practical Embodiment 1 of the present disclosure will be described with reference to FIGS. 1 to 6. The upper support 10 has a structure in which a support main body 14 that is configured to receive a suspension component 12 is attached to a center portion of a bracket 18 that is configured to be attached to a vehicle body 16 on a vehicle body side. The orientation of the upper support 10 when it is attached to the vehicle body 16 is not limited, but in the following description, as a general rule, the vertical direction refers to the vertical direction in FIG. 3.

Suspension Component 12

The suspension component 12 to be attached to the support main body 14 can be, for example, a known shock absorber, and is provided with a piston rod 20 to be fixed to an inner member 26 of the support main body 14, which will be described later. The piston rod 20 is to be fixed to the inner member 26 by being inserted into a center hole 32 of the inner member 26 and fastened with a nut 22. The suspension component 12 also includes a bound stopper 24 to be press-fitted into a metal holder 94 in a lower metal bracket 52, which is described later.

Support Main Body 14

The support main body 14 is constituted by an inner member 26 and an outer member 28 being elastically connected by a main rubber elastic body 30.

The inner member 26 is a rigid member formed of metal or the like having an approximately annular disk shape overall, and the diametrically center portion protrudes downward from the lower surface to be partially thick-walled. The inner member 26 includes the center hole 32 penetrating the diametrically center portion in the vertical direction.

The outer member 28 is a rigid member formed of metal or the like having an approximately round tubular shape overall, and has the inner diameter dimension larger than the outer diameter dimension of the inner member 26.

The inner member 26 is coaxially arranged in the radial inside of the outer member 28, and the inner member 26 and the outer member 28 are elastically connected by the main rubber elastic body 30. The main rubber elastic body 30 has an approximately annular shape overall, and its radially inner side is bonded by vulcanization to the outer peripheral portion of the inner member 26, while its outer circumferential surface is bonded by vulcanization to the inner circumferential surface of the outer member 28. In the present practical embodiment, the main rubber elastic body 30 takes the form of an integrally vulcanization molded component is formed as an integrally vulcanized molded product including the inner member 26 and the outer member 28.

The radially inner portion of the main rubber elastic body 30 includes an upper stopper rubber 36 located above the inner member 26 and a lower stopper rubber 38 located below the inner member 26. These upper stopper rubber 36 and lower stopper rubber 38 are connected by the portion of the main rubber elastic body 30 that covers the outer circumferential surface of the inner member 26. The upper stopper rubber 36 and the lower stopper rubber 38 are both approximately round tubular shape, and protrude in the vertically opposite directions at the outer peripheral end of the inner member 26. In the present practical embodiment, the upper stopper rubber 36 and the lower stopper rubber 38 have gradually decreasing radial dimensions as they move in the vertically opposite directions.

A rubber sheath layer 40 is provided at the outer peripheral end of the main rubber elastic body 30. The rubber sheath layer 40 has a relatively thin-walled round tubular shape overall and is anchored to approximately the entire inner circumferential surface of the outer member 28. The upper stopper rubber 36 and the lower stopper rubber 38 described above are radially spaced away from the rubber sheath layer 40. Thus, annular grooves 42 and 44 extending in the circumferential direction are formed in the main rubber elastic body 30 radially between the upper stopper rubber 36 and the rubber sheath layer 40, and radially between the lower stopper rubber 38 and the rubber sheath layer 40, respectively, opening to the vertically opposite directions. The depth dimensions, the radial positions and the like of these grooves 42, 44 can be set appropriately according to the required spring characteristics of the main rubber elastic body 30 or the like.

Bracket 18

The bracket 18 comprises an upper metal bracket 50 and a lower metal bracket 52 including respective flanged parts (an upper flanged part 46 and a lower flanged part 48) which are overlapped with each other.

Upper Metal Bracket 50

Figure 2:
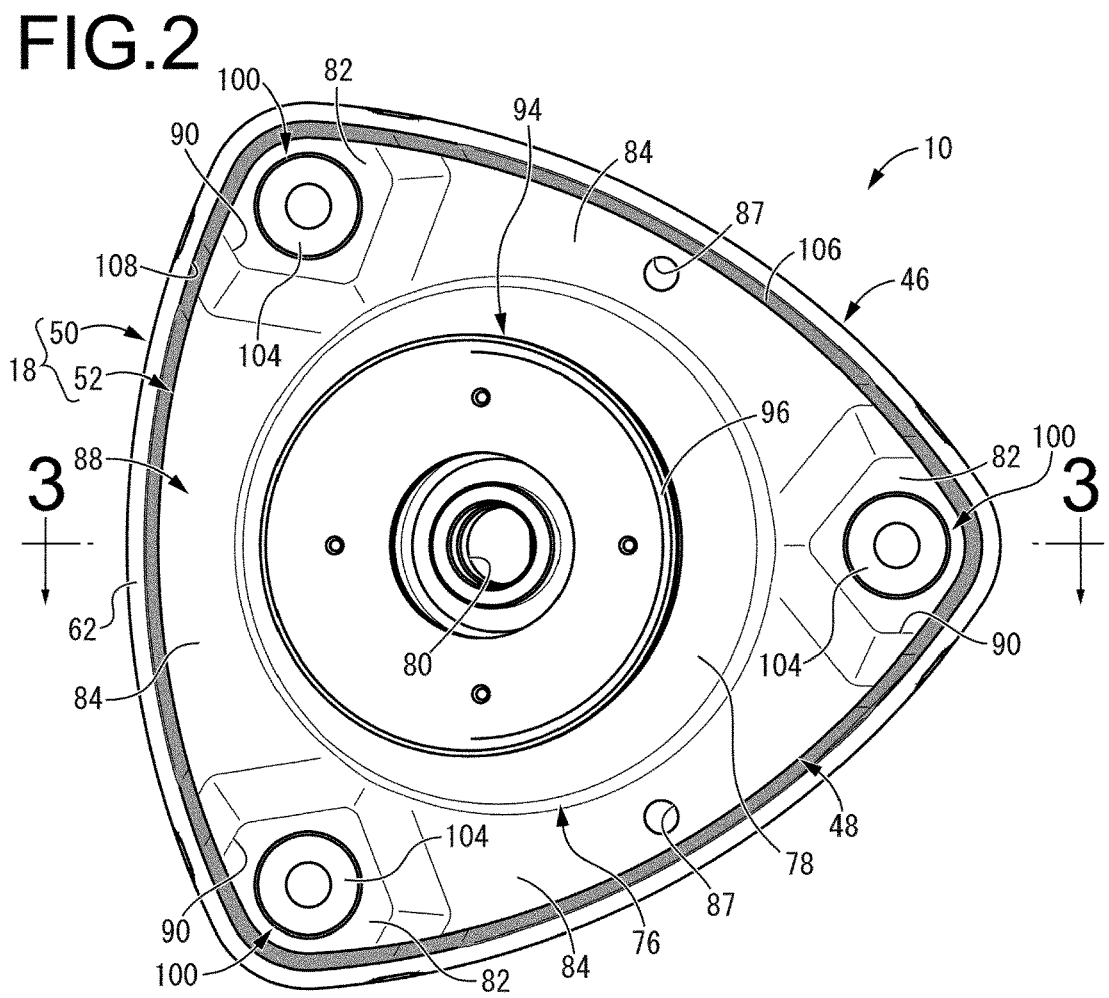
FIG. 2 is a bottom plan view of the upper support shown in FIG. 1.
Figure 3:
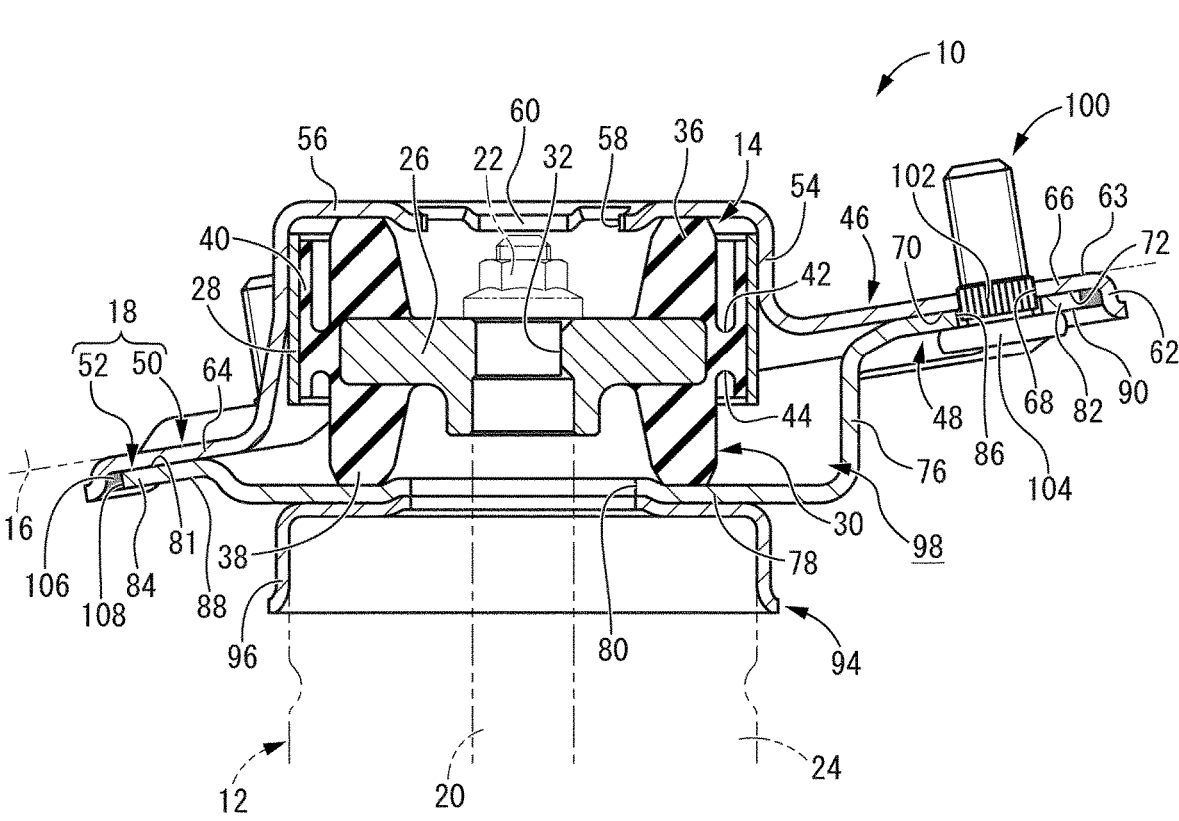
FIG. 3 is a cross sectional view taken along line 3-3 of FIG. 2.
Figure 5:
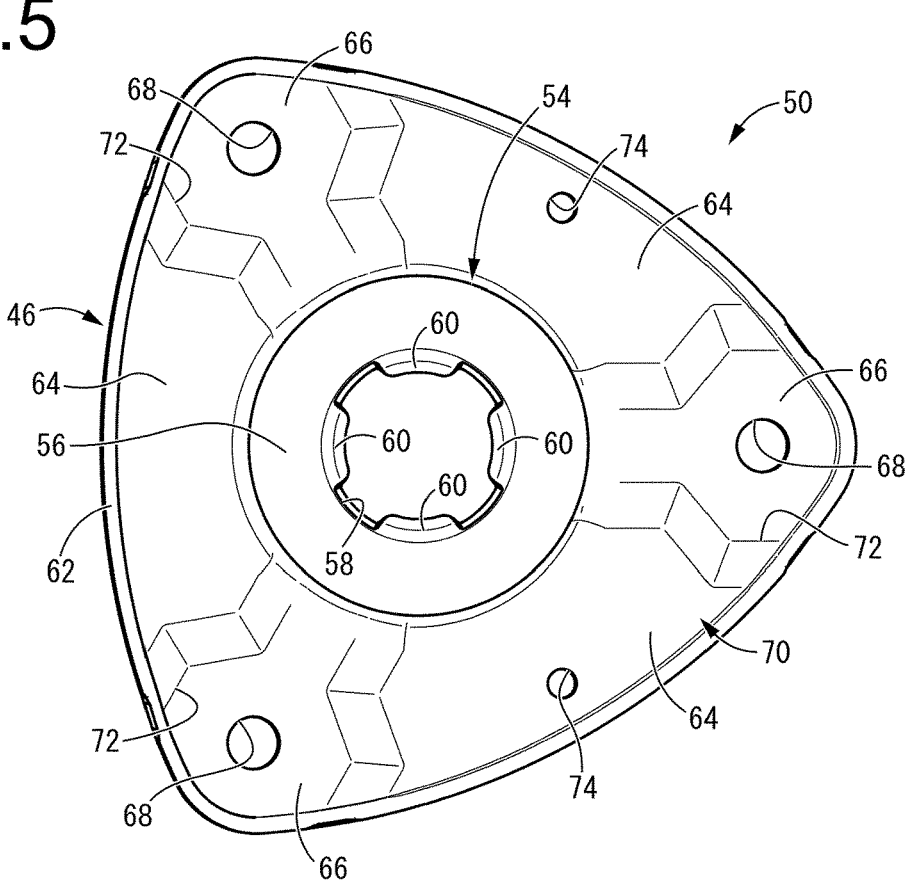
FIG. 5 is a bottom plan view showing an upper metal bracket constituting the upper support shown in FIG. 1.

The upper metal bracket 50 has a vertically inverted dish shape with a flange overall, and is approximately triangular in plan view, as shown in FIGS. 2 and 5. The center portion of the upper metal bracket 50 includes an upper tubular part 54 extending vertically, and the upper end of the upper tubular part 54 is bent radially inward to form an upper wall 56 having an approximately annular disk shape. An upper insertion hole 58 is formed in the radial inside of the upper wall 56, which penetrates the upper wall 56 in the vertical direction. In the present practical embodiment, protruding pieces 60 protrude radially inward from the inner circumferential surface of the upper wall 56, thereby varying the inner diameter dimension of the upper insertion hole 58 in the circumferential direction. In particular, in the present practical embodiment, the protruding pieces 60 are formed at four locations in the circumferential direction, and are spaced away from one another at roughly equal intervals in the circumferential direction.

At the lower end of the upper tubular part 54, the upper flanged part 46 is integrally formed, which protrudes radially outward in an annular shape. In the present practical embodiment, the upper flanged part 46 has an approximately equilateral triangle shape with round corners in plan view. In particular, in the present practical embodiment, the upper flanged part 46 spreads so as to incline with respect to the axis-perpendicular direction, and the right side part in FIG. 3, which is one corner of the triangular shape, is located above the left side parts in FIG. 3, which are the other two corners. Besides, the outer peripheral edge of the upper flanged part 46 integrally includes a covering part 62. With the upper and lower metal brackets 50, 52 overlapped with each other, the covering part 62 extends radially outward further than the outer peripheral end edge of the lower flanged part 48 and curves downward.

Furthermore, the upper flanged part 46 includes, on an upper surface 63, lowered regions 64 that are lowered and spread in a plurality of regions in the circumferential direction, and attachment regions 66 that spread above the lowered regions 64 in the portions that are circumferentially off the lowered regions 64.

Specifically, the attachment regions 66 protrude radially outward from a plurality of locations in the circumferential direction at the lower end of the upper tubular part 54. In the present practical embodiment, the attachment regions 66 are provided at three locations in the circumferential direction, and the attachment regions 66 extend out from the lower end of the upper tubular part 54 toward the respective corners of the upper flanged part 46, which has the approximately equilateral triangle shape. With this configuration, the attachment regions 66 are spaced away from one another at roughly equal intervals in the circumferential direction. Each attachment region 66 is formed with a predetermined circumferential dimension (width dimension), and each attachment region 66 is formed with a larger region on the radially outer side than on the radially inner side in plan view. Besides, in each attachment region 66, a bolt insertion hole 68 is formed in the radially outer portion, which has the larger region. The bolt insertion hole 68 penetrates the upper flanged part 46 in the thickness direction.

Each of the lowered regions 64 is provided circumferentially between the attachment regions 66, and connects the attachment regions 66, 66 that are adjacent in the circumferential direction. Specifically, the lowered regions 64 are formed at three locations in the circumferential direction in the upper flanged part 46, each with a predetermined circumferential dimension. In the present practical embodiment, as will be described later, the upper metal bracket 50 is constituted by press working on a single flat sheet of metal, and the upper metal bracket 50 has a generally constant thickness dimension throughout its entirety. With this configuration, in a lower surface 70 of the upper flanged part 46, the portions corresponding to the respective attachment regions 66 are located above the portions corresponding to the respective lowered regions 64, and recessed regions 72 are formed at the locations where the respective attachment regions 66 are formed, so as to open downward and extends radially outward. That is, the recessed regions 72 are formed at three locations in the circumferential direction on the lower surface 70 of the upper flanged part 46, and the recessed regions 72 are spaced away from one another at roughly equal intervals in the circumferential direction. Besides, the two lowered regions 64 among those provided at three locations in the circumferential direction each include a through hole 74 penetrating the upper flanged part 46 in the thickness direction, and a positioning pin (not shown), which is used to fix the upper metal bracket 50 and the lower metal bracket 52, is configured to be inserted through each through hole 74.

Lower Metal Bracket 52

Figure 6:
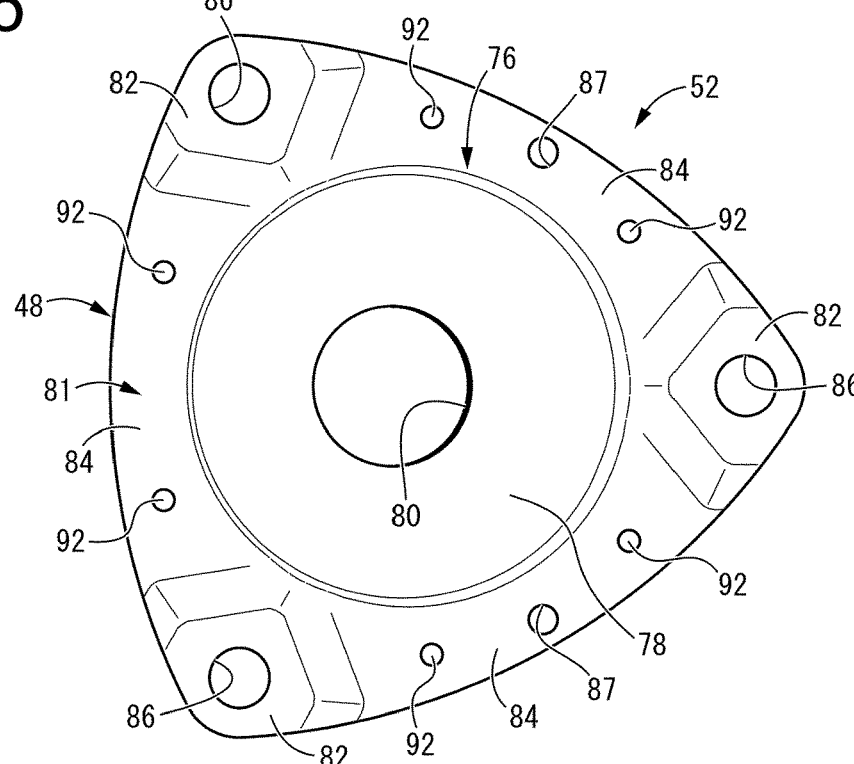
FIG. 6 is a top plan view showing a lower metal bracket constituting the upper support shown in FIG. 1.

The lower metal bracket 52 has a dish shape with a flange overall, and is approximately triangular in plan view, as shown in FIGS. 2 and 6. The center portion of the lower metal bracket 52 includes a lower tubular part 76 extending vertically, and the lower end of the lower tubular part 76 is bent radially inward to form a lower wall 78 having an approximately annular disk shape. A lower insertion hole 80 is formed in the radial inside of the lower wall 78, which penetrates the lower wall 78 in the vertical direction.

At the upper end of the lower tubular part 76, the lower flanged part 48 is integrally formed, which protrudes radially outward in an annular shape. In the present practical embodiment, the lower flanged part 48 has a shape similar to the upper flanged part 46 in plan view, and the lower flanged part 48 is formed in a smaller size than the upper flanged part 46. The lower flanged part 48 spreads so as to incline in the same direction as the upper flanged part 46 does, with respect to the axis-perpendicular direction.

In particular, in the present practical embodiment, bolt-fixing regions 82 are provided at the respective corners of an upper surface 81 of the lower flanged part 48, which is approximately triangular in plan view. The bolt-fixing regions 82 are located above the other portions. Besides, welding regions 84 are provided at portions that are circumferentially off the bolt-fixing regions 82 and are located below the bolt-fixing regions 82. That is, in the lower flanged part 48, the bolt-fixing regions 82 are provided at the locations corresponding to the respective attachment regions 66 in the upper flanged part 46, while the welding regions 84 are provided at the locations corresponding to the respective lowered regions 64. With this configuration, the bolt-fixing regions 82 are formed at three locations in the circumferential direction in the lower flanged part 48, while welding regions 84 are formed at three locations circumferentially between the bolt-fixing regions 82. Each bolt-fixing region 82 has a predetermined size in plan view, and a bolt insertion hole 86 is formed in the approximately center of each bolt-fixing region 82. The bolt insertion hole 86 penetrates the lower flanged part 48 in the thickness direction. The two of the three welding regions 84 each include a through hole 87 formed at a location corresponding to the through hole 74 in the upper flanged part 46, and the positioning pin (not shown), which is used to fix the upper metal bracket 50 and the lower metal bracket 52, is configured to be inserted through each through hole 87.

In the present practical embodiment, as will be described later, the lower metal bracket 52 is constructed by press working on a single flat sheet of metal, and the lower metal bracket 52 has a generally constant thickness dimension throughout its entirety. With this configuration, in a lower surface 88 of the lower flanged part 48, the portions corresponding to the respective bolt-fixing regions 82 are located above the portions corresponding to the respective welding regions 84, and recesses 90 opening downward are formed at the locations where the respective bolt-fixing regions 82 are formed. That is, the recesses 90 are formed at three locations in the circumferential direction on the lower surface 88 of the lower flanged part 48, and the recesses 90 are spaced away from one another at roughly equal intervals in the circumferential direction.

Figure 4:
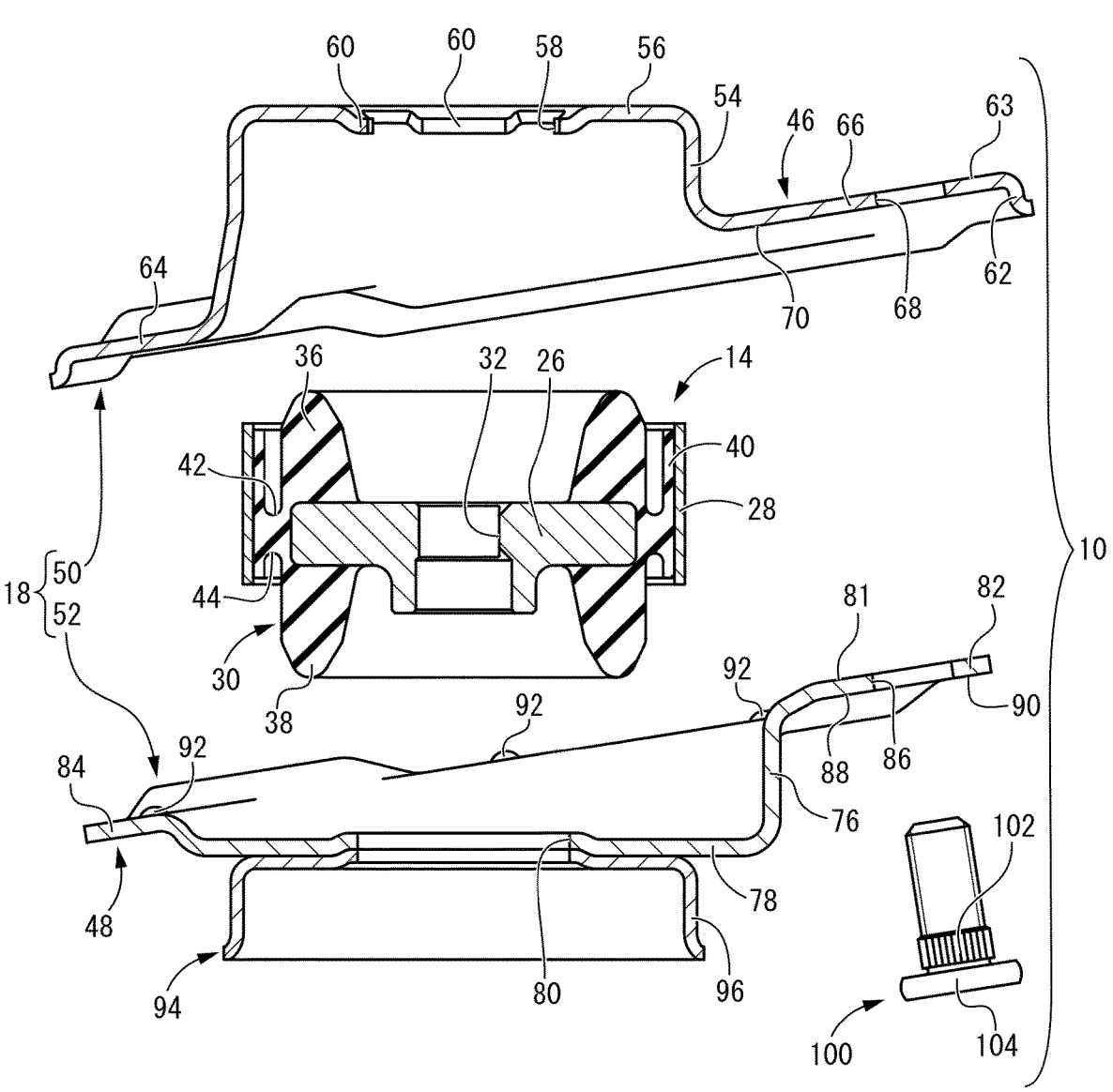
FIG. 4 is an exploded perspective view of the upper support shown in FIG. 1.

Here, in the isolated state of the lower metal bracket 52 before fixing the upper metal bracket 50 and the lower metal bracket 52, projections 92 for projection welding are formed protruding upward in the respective welding regions 84 of the upper surface 81 in the lower flanged part 48. Each projection 92 is formed by press working on the lower flanged part 48, and as shown in FIGS. 4 and 6, each projection 92 is formed with a hemispherical shape on the upper surface 81. In the present practical embodiment, two projections 92 are formed in each welding region 84 so as to be spaced away from each other in the circumferential direction. Thus, a total of six projections 92 are formed in the lower metal bracket 52 so as to be spaced away from one another in the circumferential direction.

Furthermore, in the lower metal bracket 52, a metal holder 94 is fixed to the lower surface of the lower wall 78. The metal holder 94 includes an approximately tubular holding part 96 into which the bound stopper 24 is configured to be press-fitted as described above. In the present practical embodiment, the metal holder 94 is fixed to the lower wall 78 of the lower metal bracket 52 by projection welding.

The upper metal bracket 50 and the lower metal bracket 52, which are shaped as described above, are each formed by pressing working on a single flat sheet of metal, and in the present practical embodiment, each is composed of a steel plate having a predetermined thickness dimension. These upper metal bracket 50 and lower metal bracket 52 may be subjected to one or more surface treatments for the purpose of rust prevention, retention of painting described later, and the like. In the present practical embodiment, the entire surfaces of the upper and lower metal brackets 50, 52 are subjected to a blasting treatment, and after this blasting treatment, a conversion treatment is applied to form a conversion coating. The specific conversion treatment method is not limited, but known conversion treatment methods such as a phosphate treatment, a chromate treatment, a blackening treatment, a passivation treatment, etc. may be adopted.

In particular, in the present practical embodiment, in the assembled state of the upper support 10, the entire outer surface (the upper surface of the upper metal bracket 50 and the lower surface of the lower metal bracket 52) that is exposed to the outside is subjected to a painting treatment for the purpose of rust prevention. When the respective overlapping surfaces of the flanged parts 46, 48 (the lower surface 70 and the upper surface 81) are subjected to a blasting treatment or a conversion treatment as described above, or a known plating treatment, it is preferable that the overlapping surfaces (the lower surface 70 and the upper surface 81) after each treatment have good electrical conductivity so that projection welding or spot welding can be performed as will be described later.

The bracket 18 is then constituted by these upper metal bracket 50 and lower metal bracket 52 being overlapped at the upper flanged part 46 and the lower flanged part 48. With this arrangement, the upper tubular part 54 and the lower tubular part 76 provided at the respective diametrical center portions of the upper metal bracket 50 and the lower metal bracket 52 form a tubular support housing 98, in which the support main body 14 is housed, in the bracket 18. In the present practical embodiment, the lower tubular part 76 is larger in diameter than the upper tubular part 54, and the support housing 98 is formed by the opening of the upper tubular part 54 being covered with the lower tubular part 76. In particular, in the present practical embodiment, the support main body 14 can be fixed to the bracket 18 with the support main body 14 housed in the support housing 98 by the support main body 14 being press-fitted into the upper tubular part 54. In such a state where the support main body 14 is housed in the support housing 98, the upper stopper rubber 36 of the support main body 14 is in close contact with the upper wall 56 while the lower stopper rubber 38 is in close contact with the lower wall 78, thereby preventing penetration of water into the bracket 18 through the upper insertion hole 58 and the lower insertion hole 80.

The lower flanged part 48 is formed in a smaller size than the upper flanged part 46, and the lower flanged part 48 is overlapped with the upper flanged part 46 on the radial inside of the covering part 62 of the upper flanged part 46. The overlapping of the upper flanged part 46 and the lower flanged part 48 is performed by using the positioning pins inserted through the through holes 74, 87, as described above. Each bolt insertion hole 68 of the upper flanged part 46 and the corresponding bolt insertion hole 86 of the lower flanged part 48 are aligned and connected with each other.

Fixing Bolt 100

A fixing bolt 100 is inserted through each bolt insertion hole 68 and the corresponding bolt insertion hole 86 that are connected with each other. In the present practical embodiment, each fixing bolt 100 comprises a knurled bolt for swaging, and includes projections and depressions that are continuous in the circumferential direction at a shaft part 102 of each fixing bolt 100.

Each fixing bolt 100 is inserted through each bolt insertion hole 68 and the corresponding bolt insertion hole 86 from below. In the present practical embodiment, a knurling provided on the shaft part 102 of each fixing bolt 100 is press-fitted into the inner circumferential surface of the corresponding bolt insertion hole 68 in the upper flanged part 46, and the upper end of the knurling protruding upward from each bolt insertion hole 68 is crushed to be swaged so as to fix the upper metal bracket 50 and the lower metal bracket 52 to each other. With this configuration, a plurality of the fixing bolts 100 that attach the bracket 18 to the vehicle body 16 on the vehicle body side are provided to the overlapped portion of the respective flanged parts 46, 48 of the upper and lower metal brackets 50, 52, the fixing bolts 100 being spaced apart from one another in the circumferential direction.

With the upper metal bracket 50 and the lower metal bracket 52 fixed to each other by the fixing bolts 100 in this way, the distal end of each fixing bolt 100 protrudes upward from the upper metal bracket 50 and is used for fixing the upper support 10 and the vehicle body 16. Meanwhile, a head part 104 of each fixing bolt 100 is housed in the corresponding recess 90 provided on the lower surface 88 of the lower flanged part 48.

Adhesive 106

In the bracket 18 described above, an adhesive 106 is applied to the radial inside of the covering part 62 of the upper flanged part 46. Accordingly, the adhesive 106 provides sealing between the covering part 62 and the outer peripheral end of the lower flanged part 48 of the lower metal bracket 52 in the outer peripheral region of each fixing bolt 100 (e.g., the peripheral region of the recess 90). That is, since the outer peripheral end of the lower flanged part 48 is located on the radial inside of the covering part 62, the adhesive 106 is applied to the outer peripheral edge of the overlapped portion of the upper and lower flanged parts 46, 48, so that the adhesive 106 provides sealing at the outer peripheral end between the overlapped surfaces (the lower surface 70 and the upper surface 81) of the flanged parts 46, 48 in the outer peripheral region of each fixing bolt 100. In particular, in the present practical embodiment, the inner circumferential surface of the covering part 62 and the outer circumferential surface of the lower flanged part 48 are opposed to each other separated by a groove 108 having a predetermined radial width dimension, and such groove 108 is formed continuously over the entire circumference in the circumferential direction. The adhesive 106 is applied over the entire circumference of the groove 108. With this arrangement, the adhesive 106 provides sealing between the covering part 62 and the outer peripheral end of the lower flanged part 48 of the lower metal bracket 52 over the entire circumference. That is, the adhesive 106 is continuously applied over the entire circumference at the outer peripheral edge of the overlapped portion of the upper and lower flanged parts 46, 48. The adhesive 106 provides sealing at the outer peripheral end between the overlapped surfaces (the lower surface 70 and the upper surface 81) of the flanged parts 46, 48 over the entire circumference. The adhesive 106 is shown in gray in FIGS. 2 and 3, and in FIGS. 7 to 9, which show Practical Embodiments 2 to 4 described later.

Manufacturing Method of Upper Support 10

Hereinafter, a specific example of the manufacturing method of the upper support 10 of the present practical embodiment will be described. The manufacturing method of the upper support 10 is not limited to the following description.

The manufacturing method of the upper support 10 according to the present practical embodiment includes the following steps:

(a) preparing the support main body 14;

(b) preparing the upper metal bracket 50 and the lower metal bracket 52 including the respective flanged parts (the upper flanged part 46 and the lower flanged part 48) configured to be overlapped with each other to constitute the bracket 18;

(c) sandwiching the support main body 14 between the upper metal bracket 50 and the lower metal bracket 52 from both the upper and lower sides to attach the support main body 14 into the tubular support housing 98 formed in the center portion between the upper and lower metal brackets 50, 52, and aligning the respective flanged parts 46, 48 of the upper and lower metal brackets 50, 52 with each other in an overlapped state;

(d) welding and fixing the respective flanged parts 46, 48 of the upper and lower metal brackets 50, 52 to each other at a plurality of locations in the circumferential direction, the upper and lower metal brackets 50, 52 having been aligned with each other in the overlapped state;

(e) performing a painting treatment on the outer surfaces of the upper and lower metal brackets 50, 52 that have been welded and fixed to each other at the respective flanged parts 46, 48;

(f) fastening the fixing bolts 100 for attachment to the vehicle body side by swaging to the respective flanged parts 46, 48 in the upper and lower metal brackets 50, 52 that have been aligned with each other in the overlapped state; and (g) applying the adhesive 106 to the outer peripheral edge of the overlapped portion of the respective flanged parts 46, 48 in the upper and lower metal brackets 50, 52 that have been aligned with each other in the overlapped state, and providing sealing at the outer peripheral end between the overlapped surfaces (the lower surface 70 of the upper flanged part 46 and the upper surface 81 of the lower flanged part 48) of the respective flanged parts 46, 48 of the upper and lower metal brackets 50, 52 with the adhesive 106.

Specifically, the support main body 14 is first formed as an integrally vulcanization molded component of the main rubber elastic body 30 including the inner member 26 and the outer member 28 (the step (a) above). In addition, a steel plate having a predetermined thickness dimension is subjected to press working to form the upper metal bracket 50 and the lower metal bracket 52 having the shapes as described above (the step (b) above). Subsequently, a blasting treatment and a conversion treatment are performed over the entire surfaces of these upper metal bracket 50 and lower metal bracket 52. Next, the support main body 14 is attached by press-fitting to the upper tubular part 54 of the upper metal bracket 50, and the lower metal bracket 52 is brought closer to the upper metal bracket 50 to align the upper and lower flanged parts 46, 48 with each other in the overlapped state (the step (c) above). Alignment of these upper and lower flanged parts 46, 48 is performed, for example, by using positioning pins (not shown) inserted through the through holes 74, 87.

In the upper and lower flanged parts 46, 48 overlapped with each other, projection welding is then performed at the locations where the respective projections 92 of the welding regions 84 are formed in the lower flanged part 48, so as to weld the overlapped surfaces (the lower surface 70 and the upper surface 81) of the upper and lower flanged parts 46, 48 to each other (the step (d) above). Subsequently, a painting treatment is performed on the upper surface of the upper metal bracket 50 and the lower surface of the lower metal bracket 52 in their entireties, which are the outer surfaces of the upper and lower metal brackets 50, 52 (the step (e) above). Next, in these metal brackets 50, 52, the fixing bolts 100 are inserted from below through the respective bolt insertion holes 68, 86, which are connected with each other, to fix the metal brackets 50, 52 by swaging (the step (f) above). Then, the adhesive 106 is applied to the groove 108 between the covering part 62 of the upper flanged part 46 and the outer circumferential surface of the lower flanged part 48 to provide sealing at the outer peripheral end between the overlapped surfaces (the lower surface 70 and the upper surface 81) of the upper and lower flanged parts 46, 48 (the step (g) above). This completes the manufacture of the upper support 10 according to the present practical embodiment.

The upper support 10 according to the present practical embodiment manufactured in this way is fixed to the vehicle body 16 while being attached to the upper end portion of the suspension component 12 (the shock absorber), as described above. The fixing of the upper support 10 to the vehicle body 16 is performed by using the fixing bolts 100.

According to the upper support 10 of the present practical embodiment, the adhesive 106 is applied to the groove 108 formed between the covering part 62 of the upper flanged part 46 and the lower flanged part 48. Thus, even if a gap occurs between the upper and lower flanged parts 46, 48 due to the fastening of the fixing bolts 100, penetration of water through the said gap is prevented. This improves the rust prevention performance of the upper support 10, thereby achieving improvement in durability. In particular, in the present practical embodiment, the groove 108 is continuously formed over the entire circumference between the covering part 62 and the lower flanged part 48, and the adhesive 106 is applied over the entire circumference of such groove 108. Accordingly, improvement in rust prevention performance and in durability mentioned above can be more reliably achieved.

In the present practical embodiment, the overlapped portion of the respective flanged parts 46, 48 of the upper and lower metal brackets 50, 52 is welded and fixed by projection welding utilizing the heat generated due to energization in each of the flanged parts 46, 48. In particular, the portions to be welded in the upper flanged part 46 are the lowered regions 64, which are located below the other portions. This makes it possible to perform welding with the distance between the upper and lower flanged parts 46, 48 being small, so that penetration of water through the gap between these upper and lower flanged parts 46, 48 can be more effectively prevented.

In addition, the portions of the upper flanged part 46 that are circumferentially off the lowered regions 64 are the attachment regions 66 where the respective fixing bolts 100 are provided. Since these attachment regions 66 are partially provided in the circumferential direction, when the upper support 10 is mounted to the vehicle, the contact area between the vehicle body 16 and the upper support 10 can be reduced, thereby suppressing the generation of noise, etc. due to vibration of vehicle driving.

Practical Embodiment 2

Figure 7:
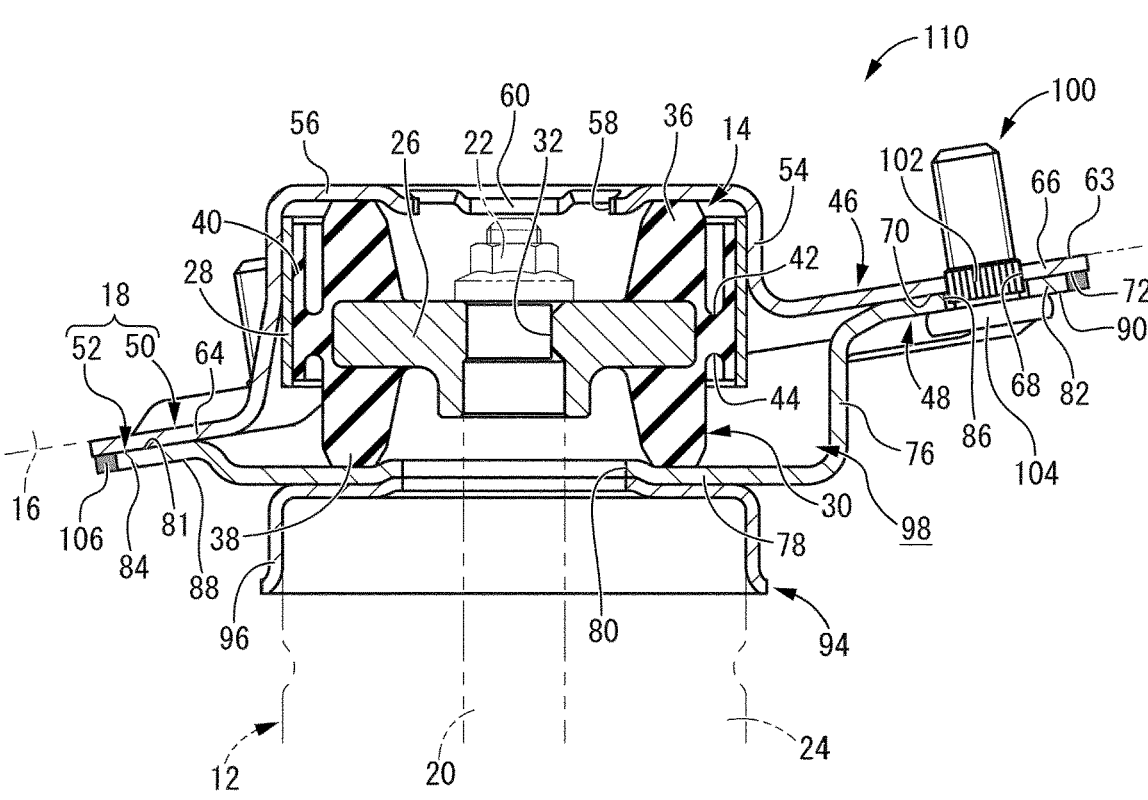
FIG. 7 is a vertical cross sectional view showing an upper support according to Practical Embodiment 2 of the present disclosure, corresponding to FIG. 3.

Hereinafter, an upper support 110 according to Practical Embodiment 2 of the present disclosure will be described below with reference to FIG. 7. The basic structure of the upper support 110 of the present practical embodiment is similar to that of Practical Embodiment 1, but the shape of the upper metal bracket 50 is different from that of Practical Embodiment 1. In the following description, elements like those in the preceding practical embodiment shall be designated by like reference numerals and will not be discussed in detail.

In the present practical embodiment as well, the upper flanged part 46 of the upper metal bracket 50 is formed larger in plan view than the lower flanged part 48 of the lower metal bracket 52. However, the outer peripheral edge of the upper flanged part 46 is not provided with the covering part 62 extending downward, so that the outer peripheral edge of the lower flanged part 48 is not covered by the covering part 62 in the present practical embodiment. Specifically, when the flanged parts 46, 48 are overlapped in the aligned state with each other, the outer peripheral end surface of the upper flanged part 46 and the outer peripheral end surface of the lower flanged part 48 are located to make a step, and the adhesive 106 is applied to the position where the step is formed. With this arrangement, in the present practical embodiment, the adhesive 106 is applied to the outer peripheral edge of the overlapped portion of the flanged parts 46, 48, namely, the outer peripheral edge of the lower flanged part 48 on the lower surface 70 of the upper flanged part 46, so that the adhesive 106 provides sealing between the overlapped surfaces (the lower surface 70 and the upper surface 81) of the flanged parts 46, 48. As a result, penetration of water through the gap between these overlapped surfaces (the lower surface 70 and the upper surface 81) is prevented, thereby achieving the same effect as in Practical Embodiment 1.

In particular, in the present practical embodiment as well, it is preferable that the outer peripheral edge of the overlapped portion of the respective flanged parts 46, 48 of the upper and lower metal brackets 50, 52 be continuously coated with the adhesive 106 over the entire circumference. By so doing, the adhesive 106 provides sealing at the outer peripheral end between the overlapped surfaces (the lower surface 70 and the upper surface 81) of the flanged parts 46, 48 over the entire circumference, thereby more reliably preventing penetration of water through the gap between the overlapped surfaces (the lower surface 70 and the upper surface 81).

Practical Embodiment 3

Figure 8:
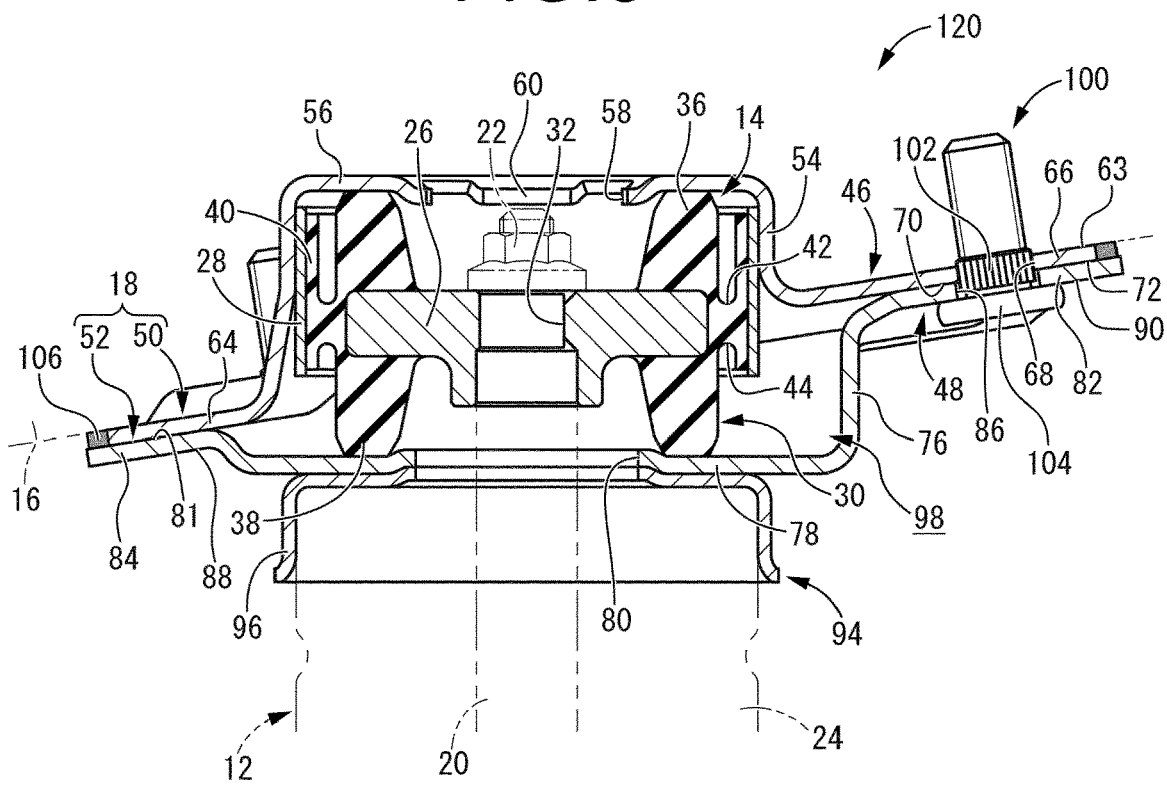
FIG. 8 is a vertical cross sectional view showing an upper support according to Practical Embodiment 3 of the present disclosure, corresponding to FIG. 3.

Hereinafter, an upper support 120 according to Practical Embodiment 3 of the present disclosure will be described below with reference to FIG. 8. In the present practical embodiment, the lower flanged part 48 of the lower metal bracket 52 is formed larger in plan view than the upper flanged part 46 of the upper metal bracket 50. With this configuration, in the present practical embodiment as well, when the flanged parts 46, 48 are overlapped in the aligned state with each other, the outer peripheral end surface of the upper flanged part 46 and the outer peripheral end surface of the lower flanged part 48 are located to make a step, and the adhesive 106 is applied to the position where the step is formed. Specifically, in Practical Embodiment 3, the adhesive 106 is applied to the outer peripheral edge of the upper flanged part 46 on the upper surface 81 of the lower flanged part 48. As a result, the same effect as in Practical Embodiment 1 can be achieved. In the present practical embodiment as well, it is preferable that the outer peripheral edge of the overlapped portion of the flanged parts 46, 48 be continuously coated with the adhesive 106 over the entire circumference.

Practical Embodiment 4

Figure 9:
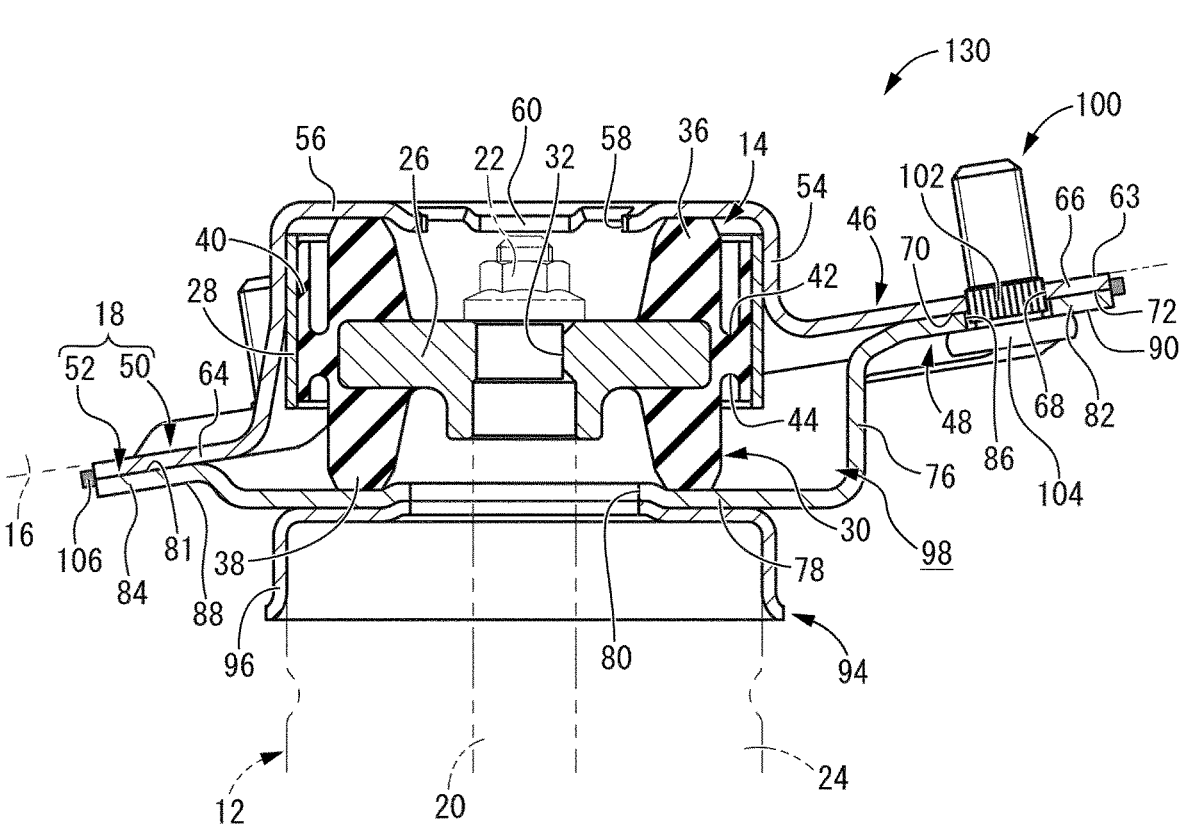
FIG. 9 is a vertical cross sectional view showing an upper support according to Practical Embodiment 4 of the present disclosure, corresponding to FIG. 3.

Hereinafter, an upper support 130 according to Practical Embodiment 4 of the present disclosure will be described below with reference to FIG. 9. In the present practical embodiment, the upper flanged part 46 of the upper metal bracket 50 and the lower flanged part 48 of the lower metal bracket 52 are formed in approximately equal sizes, and when the flanged parts 46, 48 are overlapped in the aligned state with each other, the outer peripheral end surface of the upper flanged part 46 and the outer peripheral end surface of the lower flanged part 48 are continuous with almost no step. In the present practical embodiment, the adhesive 106 is applied astride the outer peripheral end surface of the upper flanged part 46 and the outer peripheral end surface of the lower flanged part 48. This prevents penetration of water through the gap between the overlapped surfaces (the lower surface 70 and the upper surface 81) of the flanged parts 46, 48. By so doing, the same effect as in Practical Embodiment 1 can be achieved. In the present practical embodiment as well, it is preferable that the outer peripheral edge of the overlapped portion of the flanged parts 46, 48 be continuously coated with the adhesive 106 over the entire circumference.

Variation

Although Practical Embodiments 1 to 4 have been described in detail as specific examples of the present disclosure, the present disclosure is not limited by these specific descriptions. Modifications, improvements, etc. to the extent that the object of the present disclosure can be achieved are included in the present disclosure. For example, the following Variations of the embodiment are also included in the technical scope of the present disclosure.

(1) In the preceding practical embodiments, the fixing
bolts 100 inserted through the respective bolt insertion
holes 68, 86 of the upper flanged part 46 and the lower
flanged part 48 are fixed by swaging, but the present
disclosure is not limited to such a mode. That is, the
fixing bolts inserted through the respective upper and
lower bolt insertion holes may be fixed by a method
other than swaging, and for example, a fixing bolt
protruding upward may be fixedly provided on the
lower flanged part.
(2) In the preceding Practical Embodiment 1, the adhesive
106 is continuously provided over the entire circum-
ference to the groove 108 formed between the covering
part 62 of the upper flanged part 46 and the outer
circumferential surface of the lower flanged part 48, but
the present disclosure is not limited to such a mode.
That is, it would be acceptable as long as the adhesive
is provided at least in the outer peripheral region of
each fixing bolt (e.g., the peripheral region of the recess
90) where a gap is likely to be generated between the
upper and lower flanged parts when fastening each
fixing bolt. Similarly, in Practical Embodiments 2 to 4,
the adhesive need not be continuously applied over the
entire circumference in the circumferential direction at
the outer peripheral edge of the overlapped portion of
the respective flanged parts of the upper and lower
metal brackets. It would be acceptable as long as the
adhesive is provided at least in the outer peripheral
region of each fixing bolt.
(3) In the preceding practical embodiments, the welding
of the upper flanged part 46 and the lower flanged part
48 is performed by projection welding, but the present
disclosure is not limited to such a mode. For example,
the upper flanged part and the lower flanged part may
be welded by spot welding.
(4) In the preceding practical embodiments, three fixing
bolts 100 are provided in the upper supports 10, 110,
120, 130, but the number of the fixing bolts is not
limited as long as the fixing bolts are provided in
plurality. For example, the number of the attachment
regions and the lowered regions in the upper flanged
part, and the number of the bolt-fixing regions and the
welding regions in the lower flanged part may be set
according to the number of the fixing bolts. That is, the
shapes of the upper flanged part and the lower flanged
part are not limited. Besides, the attachment regions,
the lowered regions, the bolt-fixing regions, and the
welding regions in the upper flanged part and the lower
flanged part are not essential, and both the upper
flanged part and the lower flanged part may be flat
without any concave and convex portions.
(5) In the preceding practical embodiments, two projec-
tions 92 for projection welding are provided in each
welding region 84, and a total of six projections 92 are
provided in the lower flanged part 48, but the present
disclosure is not limited to such a mode. That is, it
would be acceptable as long as the upper flanged part
and the lower flanged part are welded at a plurality of
locations that are spaced away from one another in the
circumferential direction. Besides, the projections for
projection welding may be provided on the upper
flanged part instead of or in addition to the lower
flanged part.
(6) The order of the steps (a)-(g) in the manufacturing
method of the upper support 10 described in the preceding Practical Embodiment 1 is not limited, and the
steps (a)-(g) may be performed in any appropriate
order.

What is claimed is:

1. An upper support comprising:
a bracket configured to be attached to a vehicle body side;
and
a support main body configured to receive a suspension
component while being attached to a center portion of
the bracket, wherein
the bracket comprises an upper metal bracket and a lower
metal bracket, the upper and lower metal brackets
including respective flanged parts overlapped with each
other,
overlapped surfaces of the respective flanged parts of the
upper and lower metal brackets are welded and fixed at
a plurality of locations in a circumferential direction,
a plurality of fixing bolts configured to attach the bracket
to the vehicle body side are provided to an overlapped
portion of the respective flanged parts of the upper and
lower metal brackets, the fixing bolts being spaced
apart from one another in the circumferential direction,
and
an adhesive is applied to an outer peripheral edge of the
overlapped portion of the respective flanged parts of the
upper and lower metal brackets, and the adhesive
provides sealing at an outer peripheral end between the
overlapped surfaces of the respective flanged parts of
the upper and lower metal brackets in outer peripheral
regions of the corresponding fixing bolts.
2. The upper support according to claim 1, wherein the
adhesive is continuously applied over an entire circumfer-
ence at the outer peripheral edge of the overlapped portion
of the respective flanged parts of the upper and lower metal
brackets, and the adhesive provides sealing at the outer
peripheral end between the overlapped surfaces of the
respective flanged parts of the upper and lower metal
brackets over the entire circumference.
3. The upper support according to claim 1, wherein the
flanged part of the upper metal bracket includes lowered
regions that are lowered and spread in a plurality of regions
in the circumferential direction, and the overlapped surfaces
of the respective flanged parts of the upper and lower metal
brackets are welded and fixed to each other at the lowered
regions.
4. The upper support according to claim 3, wherein the
flanged part of the upper metal bracket includes attachment
regions that spread above the lowered regions in portions
that are circumferentially off the lowered regions, and the
fixing bolts are provided to the corresponding attachment
regions.
5. The upper support according to claim 1, wherein the
overlapped portion of the respective flanged parts of the
upper and lower metal brackets is welded and fixed by
projection welding.
6. A method of manufacturing an upper support including
a bracket configured to be attached to a vehicle body side,
and a support main body configured to receive a suspension
component while being attached to a center portion of the
bracket, the method comprising:
preparing the support main body;
preparing an upper metal bracket and a lower metal
bracket including respective flanged parts configured to
be overlapped with each other to constitute the bracket;
sandwiching the support main body between the upper
metal bracket and the lower metal bracket from both
upper and lower sides to attach the support main body into a tubular support housing formed in the center portion between the upper and lower metal brackets, and aligning the respective flanged parts of the upper and lower metal brackets with each other in an over-lapped state;

welding and fixing the respective flanged parts of the upper and lower metal brackets to each other at a plurality of locations in a circumferential direction, the upper and lower metal brackets having been aligned with each other in the overlapped state;

performing a painting treatment on outer surfaces of the upper and lower metal brackets that have been welded and fixed to each other at the respective flanged parts;

fastening fixing bolts for attachment to the vehicle body side by swaging to the respective flanged parts in the upper and lower metal brackets that have been aligned with each other in the overlapped state; and applying an adhesive to an outer peripheral edge of an overlapped portion of the respective flanged parts in the upper and lower metal brackets that have been aligned with each other in the overlapped state, and providing sealing at an outer peripheral end between overlapped surfaces of the respective flanged parts of the upper and lower metal brackets with the adhesive.

* * * * *